United States Patent
Yang et al.

(10) Patent No.: US 7,744,000 B2
(45) Date of Patent: Jun. 29, 2010

(54) CHIP CARD RETAINING MECHANISM

(75) Inventors: Qing Yang, Shenzhen (CN); Chia-Hua Chen, Tu-Cheng (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 1046 days.

(21) Appl. No.: 11/403,213

(22) Filed: Apr. 12, 2006

(65) Prior Publication Data
US 2006/0283947 A1    Dec. 21, 2006

(30) Foreign Application Priority Data
Jun. 17, 2005    (CN) .................. 2005 1 0035399

(51) Int. Cl.
*G06K 7/00* (2006.01)
*G06K 7/06* (2006.01)

(52) U.S. Cl. .............. 235/486; 235/441; 439/630; 455/558; 379/433.08; 379/433.09

(58) Field of Classification Search ......... 235/486, 235/441; 379/433.08, 433.09; 455/558; 439/630
See application file for complete search history.

(56) References Cited

U.S. PATENT DOCUMENTS

| | | | | |
|---|---|---|---|---|
| 5,661,634 A | * | 8/1997 | Obata et al. .......... 361/679.31 |
| 6,035,216 A | * | 3/2000 | Cheng et al. .......... 455/558 |
| 6,304,454 B1 | * | 10/2001 | Akamatsu et al. ...... 361/752 |
| 6,646,957 B2 | * | 11/2003 | Martin et al. .......... 368/10 |
| 7,238,038 B2 | * | 7/2007 | Kumagai .............. 439/326 |
| 7,494,360 B2 | * | 2/2009 | Zhan et al. ............ 439/326 |
| 2005/0191970 A1 | * | 9/2005 | Hasegawa ............. 455/90.3 |
| 2005/0208814 A1 | * | 9/2005 | Tsai et al. ............. 439/326 |
| 2006/0231619 A1 | * | 10/2006 | Lee ................... 235/441 |
| 2007/0181413 A1 | * | 8/2007 | Lin et al. ............. 200/333 |

FOREIGN PATENT DOCUMENTS

| | | |
|---|---|---|
| CN | 2512175 Y | 9/2002 |
| EP | 556970 A1 * | 8/1993 |
| JP | 2004-222170 A | 8/2004 |
| WO | WO 03054776 A1 * | 7/2003 |

* cited by examiner

*Primary Examiner*—Michael G Lee
*Assistant Examiner*—Suezu Ellis
(74) *Attorney, Agent, or Firm*—Jeffrey T. Knapp

(57) ABSTRACT

A chip card retaining mechanism for retaining a chip card (30) mounted in a electronic device 200 is provided. The electronic device includes a housing (10) having a battery compartment (12) defined therein. The chip card retaining mechanism includes a receiving portion (14) formed on the housing for fittingly receiving the chip card therein, and a locking assembly. The receiving portion is opening in the battery compartment of the electronic device. The locking assembly includes a stop mechanism configured for preventing the chip card retreating from the receiving portion, and a latch plate (28). A first end portion of the latch plate is rotatably connected with the housing such that an opposite second end portion of the latch plate is capable of opening or closing the opening of the receiving portion.

2 Claims, 8 Drawing Sheets

CHIP CARD RETAINING MECHANISM

BACKGROUND OF THE INVENTION

1. Field of the Invention

The present invention generally relates to chip card retaining mechanisms and, more particularly, to a chip card retaining mechanism for seating a chip card in a electronic device such as a mobile phone.

2. Discussion of the Related Art

Nowadays, electronic devices such as mobile phones are widely used and bring convenience to our lives, electronic devices have become a part of modern life. Every electronic device has a chip card such as a SIM (subscriber identification module) card for carrying information which is necessary for people to operate the mobile phone. The chip card may also contain personal information for the subscriber, for example, a listing of frequently used telephone numbers. Therefore, a chip card retaining mechanism is necessary for holding the chip card in electronic devices such as mobile phones.

Referring to FIG. 8, a typical chip card retaining mechanism is disclosed as follows. The chip card retaining mechanism includes a mounting base 80 and a locking element 90. A receiving groove 801 is defined in the mounting base 80 for receiving a chip card. The locking element 90 includes a fixing portion 901, an operating portion 903 and a deformable portion 905. The locking element 90 is mounted on the mounting base 80. The fixing portion 901 protrudes over the receiving groove 801 to hold the chip card. When the operating portion 903 is pulled manually, the deformable portion 905 deforms and the fixing portion 901 moves away from the receiving groove 801, the chip card can thereby be removed from the receiving groove 801 of the mounting base 80.

It can be seen that the deformable portion 905 of the locking element 90 is very large, and a height of the deformable portion 905 will increase when pulling the operating portion 903. Thus, the chip card retaining mechanism occupies too much space, which results in an overly large size for electronic devices such as mobile phones. In addition, when a person is installing or removing the chip card, he or she must hold the mobile phone and operate the locking element 90 with one hand and remove the chip card simultaneously with another hand. That is, the chip card retaining mechanism can be difficult for users to operate.

What is needed, therefore, is a chip card retaining mechanism which has small height and which can be easily operated.

SUMMARY OF THE INVENTION

A chip card retaining mechanism for retaining a chip card mounted in a electronic device. The electronic device includes a housing having a battery compartment defined therein. The chip card retaining mechanism comprises a receiving portion formed on the housing for fittingly receiving the chip card therein, and a locking assembly. The receiving portion is an opening in the battery compartment of the electronic device. The locking assembly comprises a stop mechanism configured for preventing the chip card capable of ejecting or being withdrawn from the receiving portion, and a latch plate. A first end portion of the latch plate is rotatably connected with the housing such that an opposite second end portion of the latch plate opening or closing the opening of the receiving portion.

Other advantages and novel features of the preferred embodiments of the present hinge system and its applications will become more apparent from the following detailed description when taken in conjunction with the accompanying drawings.

BRIEF DESCRIPTION OF THE DRAWINGS

Many aspects of the present chip card retaining mechanisms and their applications can be better understood with reference to the following drawings. The components in the drawings are not necessarily drawn to scale, the emphasis instead being placed upon clearly illustrating the principles of the chip card retaining mechanisms. Moreover, in the drawings, like reference numerals designate corresponding parts throughout the several views.

DETAILED DESCRIPTION OF PREFERRED EMBODIMENTS

Figure 1:
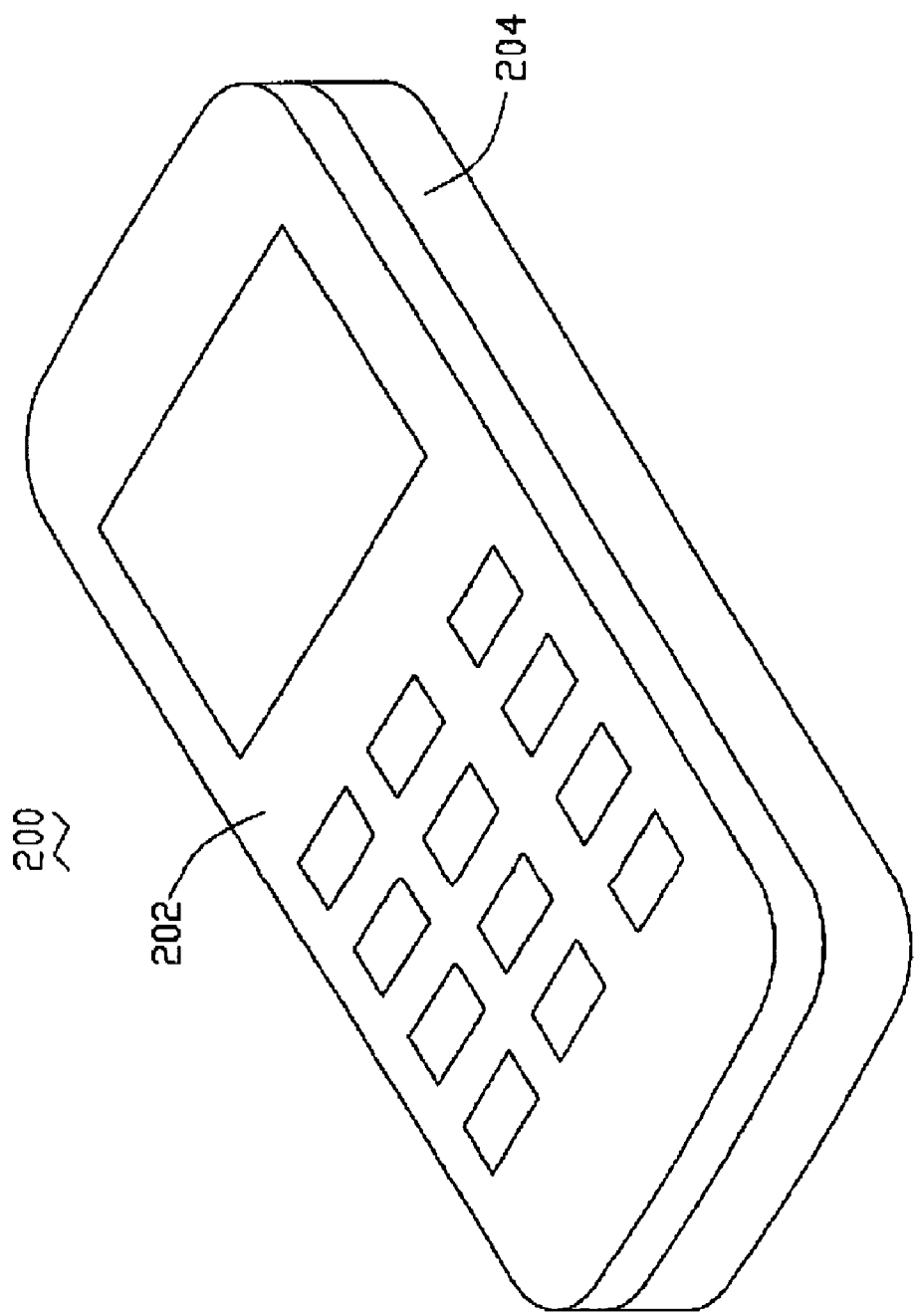
FIG. 1 is an isometric view of an electronic device, which employs a chip card retaining mechanism in accordance with a first preferred embodiment.
Figure 2:
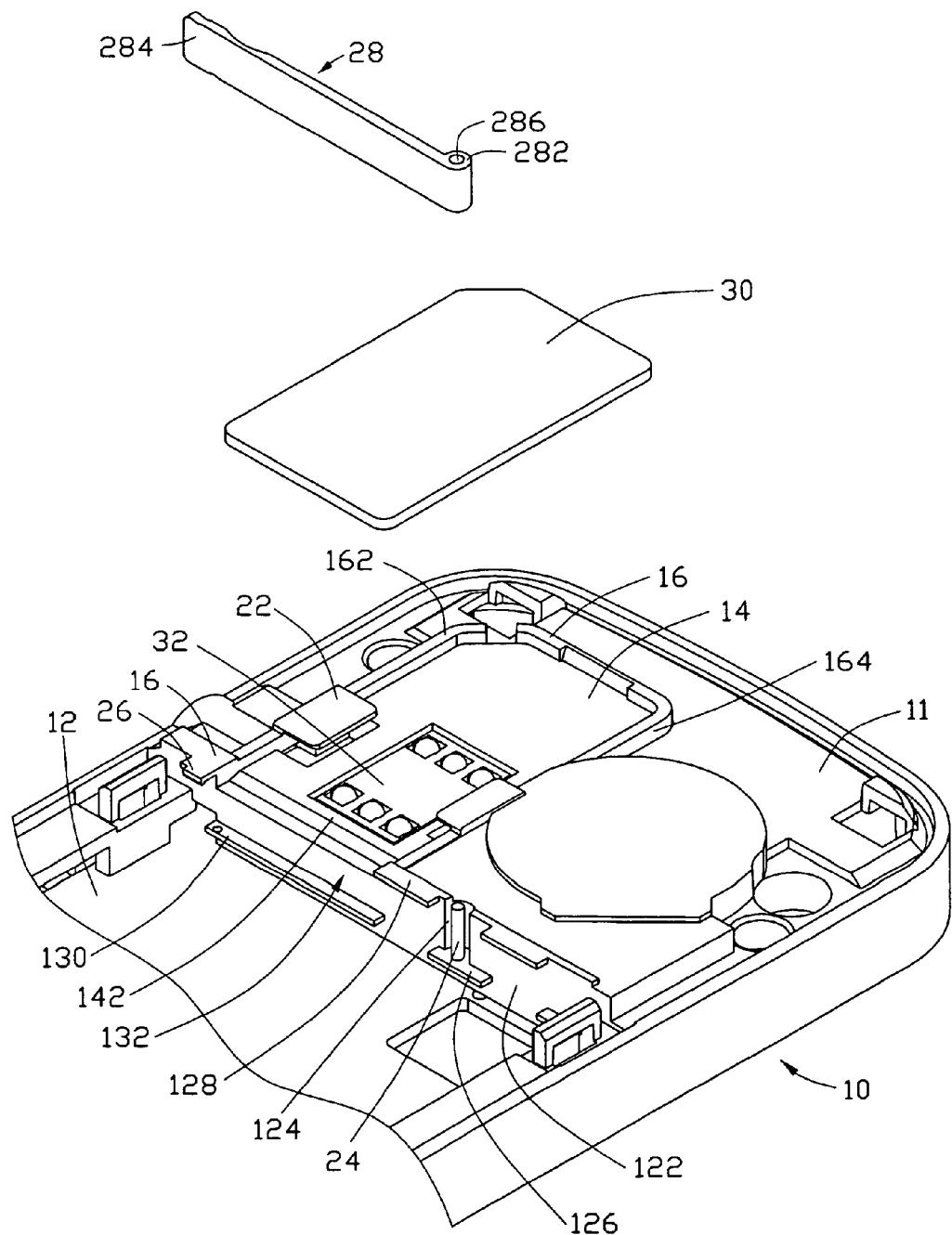
FIG. 2 is an exploded, isometric view of the chip card retaining mechanism of the chip card retaining mechanism of the preferred embodiment.
Figure 3:
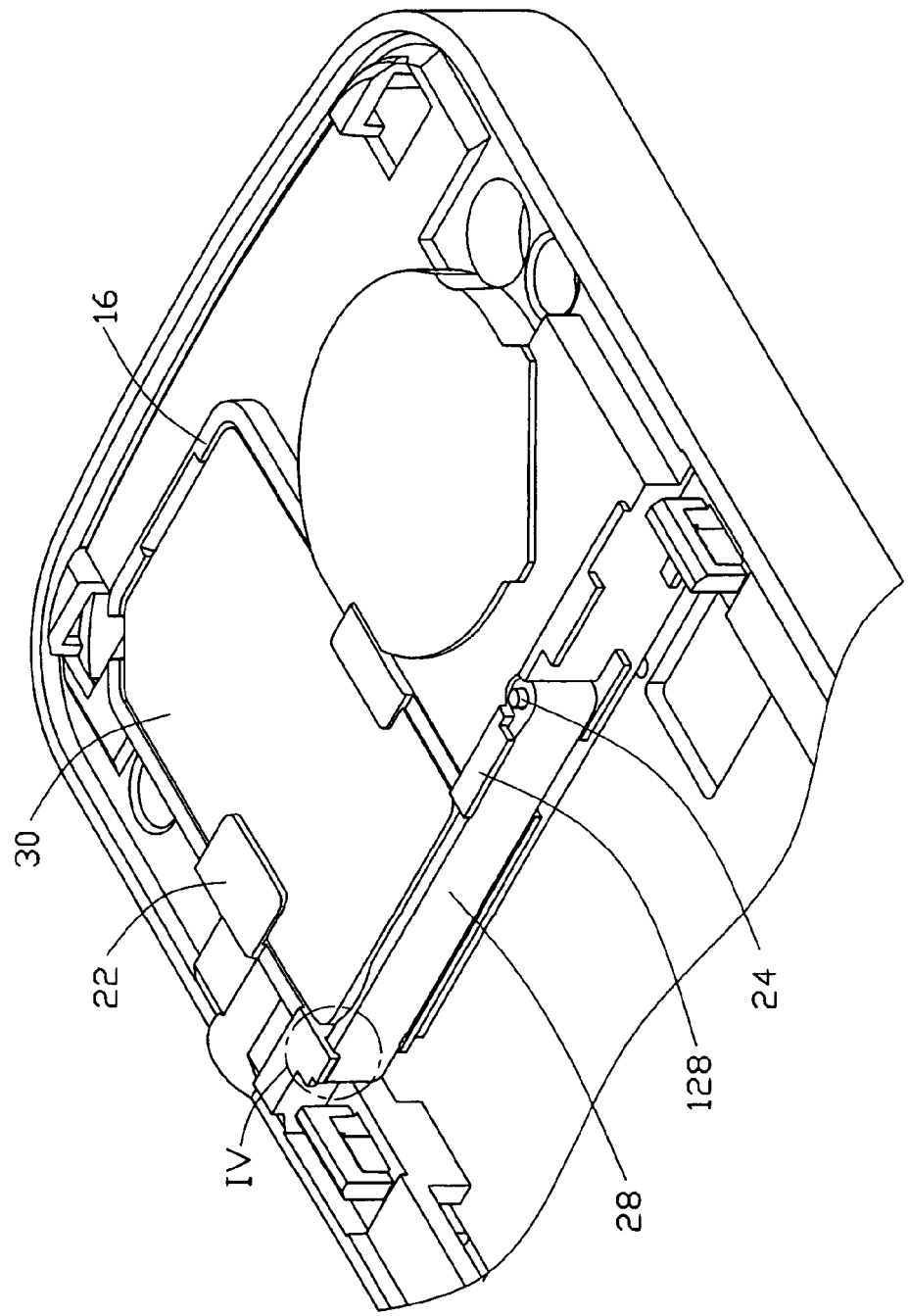
FIG. 3 is an assembled, isometric view of the chip card retaining mechanism of FIG. 2.

A chip card retaining mechanism is adapted for retaining a chip card in an electronic device such that the chip card is electrically connected with a connector in the electronic device. Referring to FIG. 1, The chip card retaining mechanism is applied to an exemplary mobile phone 200, which includes a front cover 202, a housing 10, and a rear cover 204. The front cover 202 and the rear cover 204 cooperatively define an enclosed space. The housing 10 is mounted in the enclosed space. Referring to FIG. 2, in order to identify the used mobile phone, when communicating via e.g. a GSM-net, a chip card 30, such as a subscribers identification module, also called SIM-card, is provided. Referring to FIG. 2, in the figure parts of the housing 10 have been omitted for reasons of clarity. Referring also to FIG. 3, the housing 10 has a battery compartment 12 (partly shown) defined in an upper surface 11 thereof, and defined by an inner wall 122. The chip card 30 is electrically connected to a printed circuit board (PCB, not shown) by a connector 32. The battery compartment 12 is for receiving a battery (not shown).

Referring to FIG. 2, the chip card retaining mechanism includes a receiving portion such as a receiving groove 14 for receiving the chip card 30, and a locking assembly (not labelled).

The receiving groove 14 is disposed adjacent the battery compartment 12, corresponding to the chip card 30. The receiving groove 14 has an open end 142 facing the battery compartment, for insertion or withdrawing of the chip card 30. The open end 142 is located adjacent to the inner wall 122. A strip 16 protrudes from the upper surface 11 of the housing 10. The strip 16 and a portion of the upper surface 11 cooperatively define the receiving groove 14. The strip 16 includes a first side portion 162 and a second side portion 164. The first side portion 162 and the second side portion 164 are parallel to each other. The first side portion 162 is adjacent to a peripheral edge of the housing 10. The connector 32 is exposed out of the receiving groove 14.

The chip card 30 carries information that is necessary for operating the telephone and personal information of the owner and is a kind of integrated circuit card. The chip card 30 is mounted in the receiving groove 114 in contact with the connector 32.

The locking assembly includes two wings 22, a fixing post 24 disposed on the housing 10, an elastic latching piece 26, and a latch plate 28.

Figure 4:
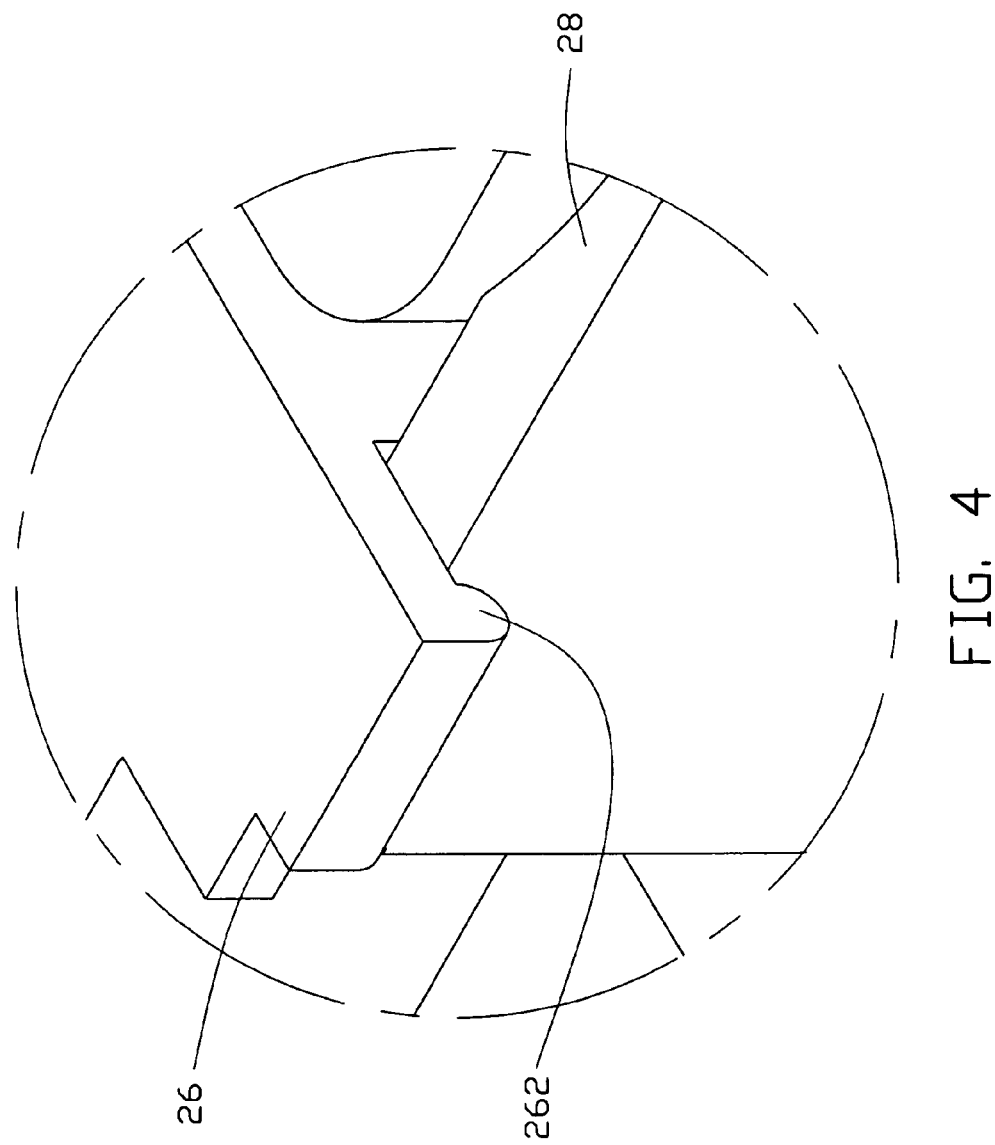
FIG. 4 is an enlarged view of portion labeled III in FIG. 3.

The two wings 22 respectively extend from the first side portion 162 and the second side portion 164 toward the receiving groove 14. The two wings 22 can be rectangular. The inner wall 122 defines an arcuate slot 124 deflecting away from the receiving groove 14. A connecting plate 126 extends vertically from a bottom of the arcuate slot 124 and the inner wall 122. The fixing post 24 extends upwardly from the support plate 126. The fixing post 24 extends in parallel, to the inner wall 122. The housing 10 has a stage 16 adjacent the first side portion 162. Referring also to FIG. 4, the elastic latching piece 26 extends from the stage 16 toward the battery compartment 12. The elastic latching piece 26 has an arcuate protrusion 262 extending downwardly from a bottom thereof.

The latch plate 28 is substantially strip-shaped, and includes a first end portion 282 and a second end portion 284. The first end portion 282 is substantially cylindrical. The first end portion 282 defines a through hole 286 extending axially therethrough. The through hole 286 receives the fixing post 24 so that the latch plate 28 is rotatably connected with the housing 10. The latch plate 28 can be rotated to cover the open end 142 of the receiving groove 142. The second end portion 284 can be releasably locked by the elastic latching piece 26.

The housing 10 has a clip plate 128 extending from the inner wall 122 toward the battery compartment 12, and adjacent to the second side portion 164. A distance between the elastic latching piece 26 and the clip plate 128 is equal to a width of the receiving groove 14. The housing 10 has a support plate 130 extending from the inner wall 122 toward the battery compartment 12, and corresponding to the open end 142 of the receiving groove 14. The length of the support plate 130 is larger than a width of the open end 142 of the receiving groove 14. The support plate 130, the elastic latching piece 26 and the clip plate 128 cooperatively define a latching trough 132. The latch plate 28 can be received in the latching trough 132.

Figure 5:
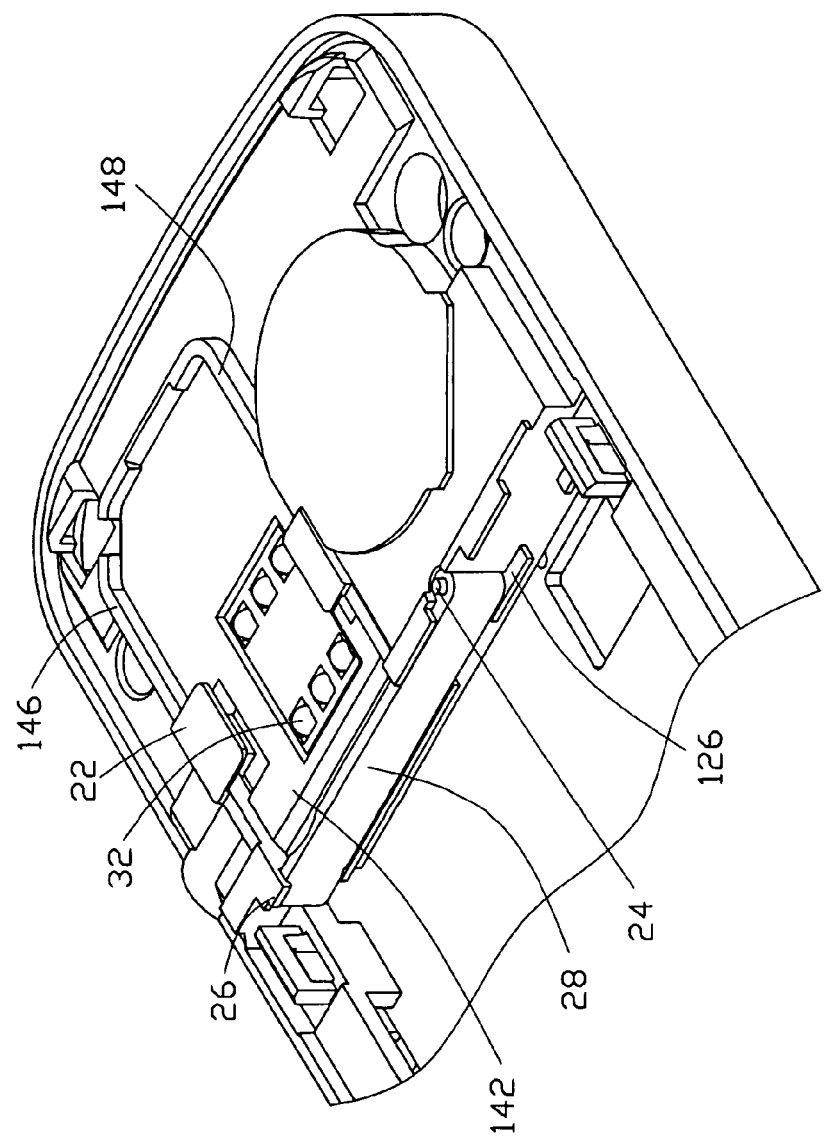
FIG. 5 is an assembled view of the chip card retaining mechanism, not showing the SIM card.
Figure 6:
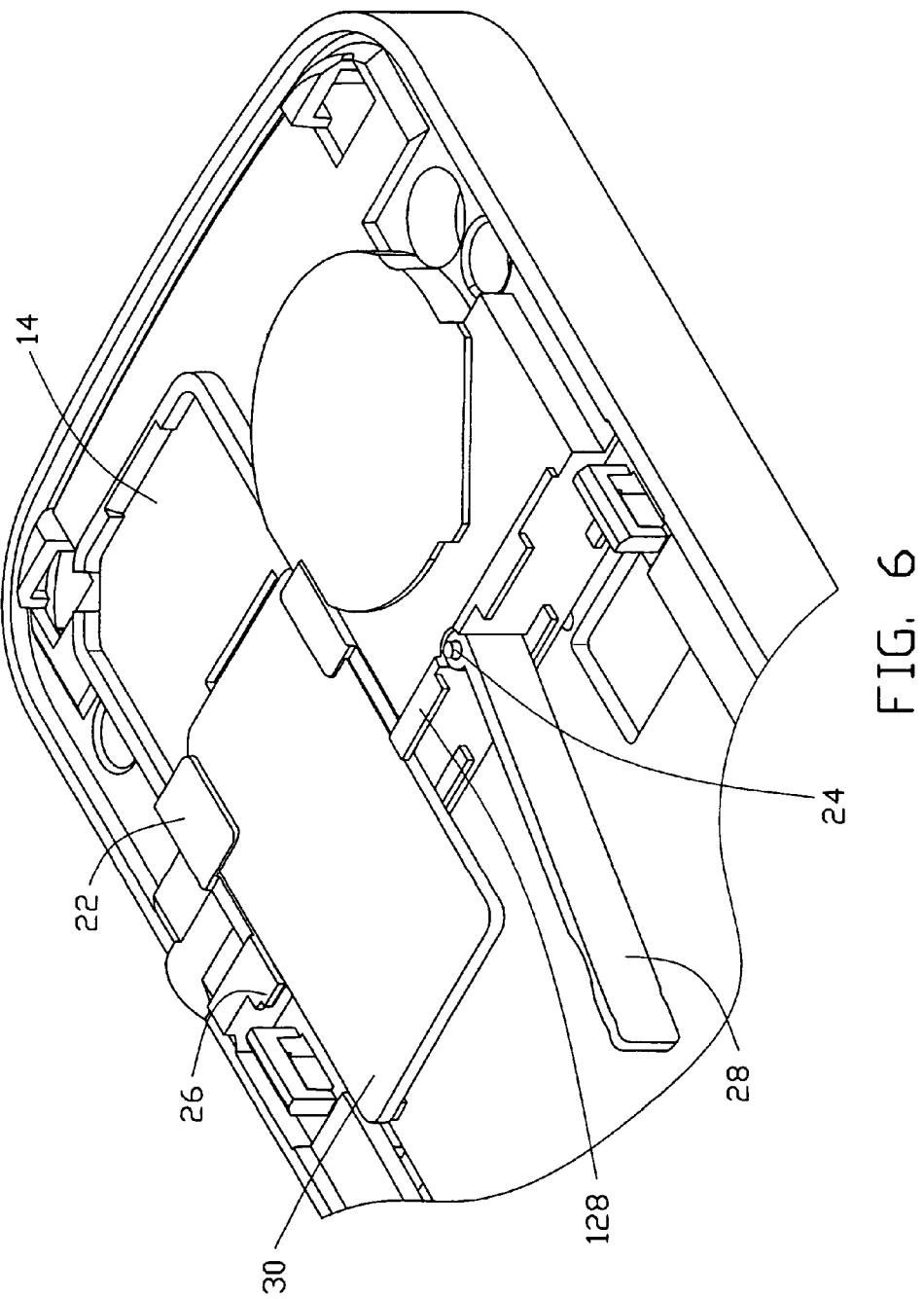
FIG. 6 is view of a stage in a process of assembling the chip card retaining mechanism.

Referring to FIGS. 5 through 6, in assembling and mounting the chip card 30 the chip card 30 is pushed into the receiving groove 14 via the open end 142 and slides in the receiving groove 14 under the guidance of the first side portion 162 and the second side portion 164. When the chip card 30 is completely contained in the receiving groove 14, the first end portion 282 of the latch plate 28 is located around the fixing post 24. The latch plate 28 is pushed by an outer force to abut against the elastic latching piece 26 such that the elastic latching piece 26 twists a predetermined elastic force when the latch plate 28 is rotated to contact the elastic latching piece 26. Simultaneously, the second end portion 284 of the latch plate 28 passes over the arcuate protrusion 262 of the elastic latching piece 26, and is securely latched beneath the elastic latching piece 26 and in the latching trough 132. Thus, the chip card 30 is securely mounted in the receiving groove 14.

When removing the chip card 30, at first, the latch plate 28 is pulled out of the latching trough 132 by an outer force, which makes the elastic latching piece 26 deforms. Then, the latch plate 28 is rotated about 90 degree. As such, the chip card 30 can be removed from the housing 10.

The chip card retaining mechanism merely includes two simple elements, i.e. the housing 10, and the latch plate 28. Thus, the chip card retaining mechanism is quite simple. In addition, the latch plate 28 is a thin board. Therefore, the chip card retaining mechanism does not occupy much space.

In alternative embodiment, the two wings 22 can be one or more, and also can be of other shapes. When the latch plate 28 is located around the fixing post 24, the fixing post 24 can dispose a flange at one end thereof, for preventing the latch plate 28 from falling. In addition, the elastic latching piece 26, the support plate 130 and the clip plate 128 can be omitted. After the chip card 30 is received in the receiving groove 14 and the latch plate 28 is located around the fixing post 24, the battery is mounted in the battery compartment 12 of the housing 10. The latch plate 28 can be secured to cover the open end 142 of the receiving groove 14 by the battery when the battery is mounted in the battery compartment 12.

In further embodiment, the wings 22 can be another stop mechanism. For example, at least one of the first side portion 162 and the second side portion 164 can define a sliding slot in a side thereof facing the receiving groove 14. As such, the chip card 30 can slide along the sliding slot into the receiving groove 14 and be secured in the receiving groove 14.

Figure 7:
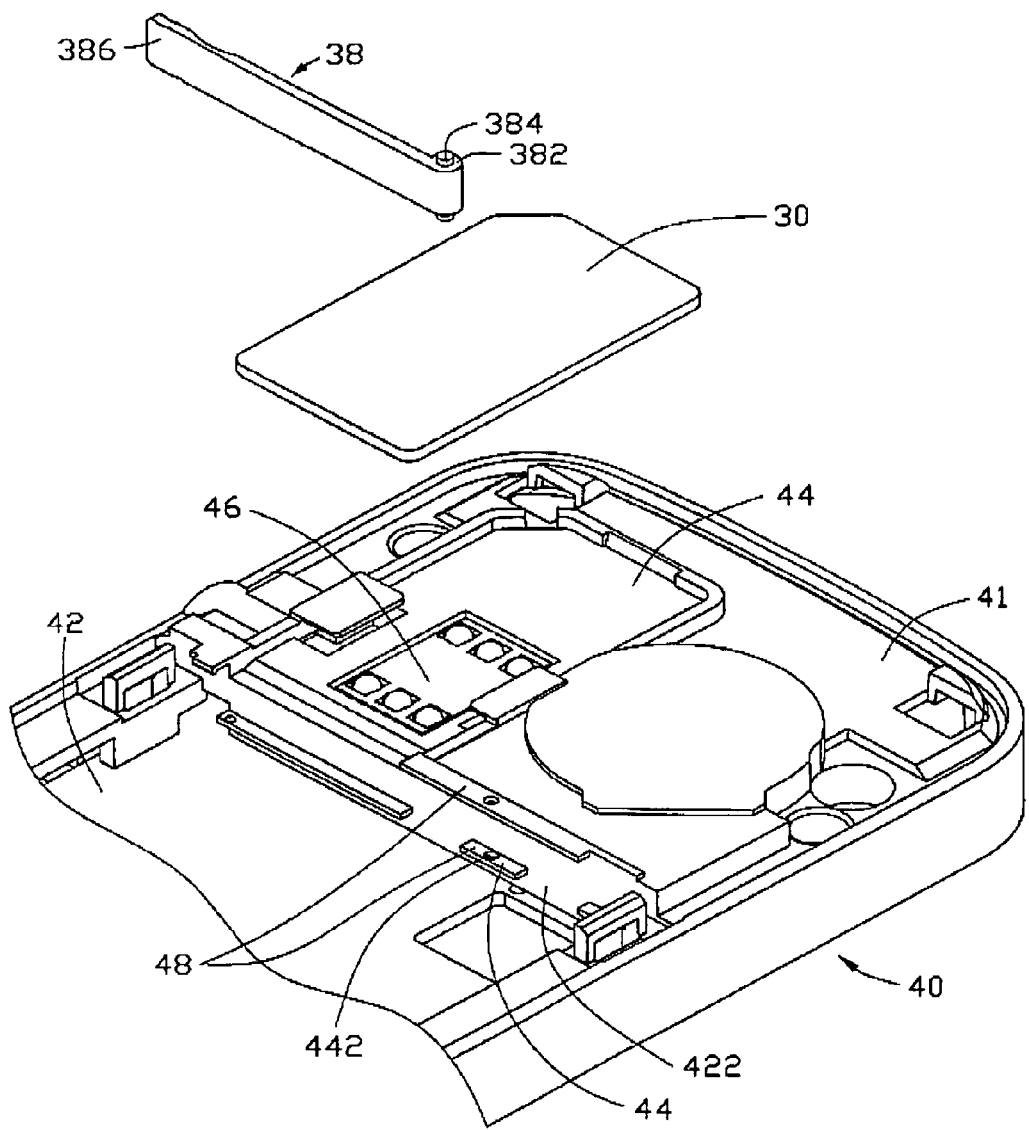
FIG. 7 is similar to FIG. 2, but showing another chip card retaining mechanism in accordance with a second preferred embodiment.
Figure 8:
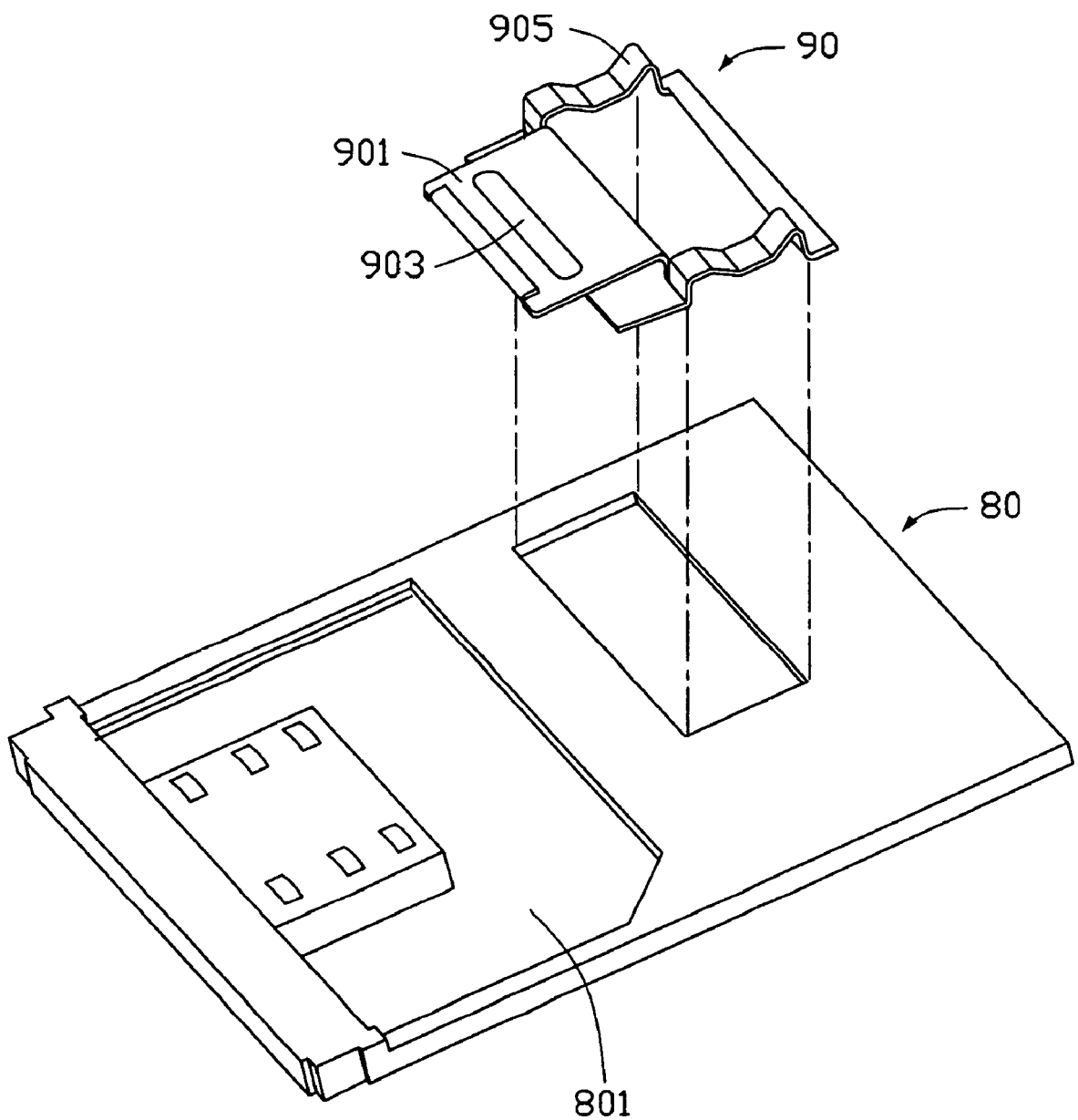
FIG. 8 an exploded, isometric view of a typical chip card retaining mechanism.

Referring to FIG. 7, a SIM card retaining mechanism according to a second preferred embodiment is provided. The chip card retaining mechanism includes a housing 40 and a latch plate 38. The housing 40 has a battery compartment 42 (partly shown) defined in an upper surface 41 thereof, and defined by an inner wall 422. The chip card 30 is electrically connected to a printed circuit board (PCB, not shown) by a connector 46. The battery compartment 42 is for receiving a battery (not shown). The housing 40 has a receiving groove 44 similar to the receiving groove 14. The latch plate 38 is substantially strip-shaped, and includes a first end portion 382 and a second end portion 386. Two fixing pins 384 extend from two ends of the first end portion 382. Two opposite connecting plates 48 extend from the inner wall 422 facing each other and separated by a distance. The connecting plates 48 respectively define a fixing hole 442. The two fixing holes 442 of the connecting plates 48 align with each other. A distance between the fixing holes 442 is larger than or equal to a breadth of the latch plate 38, and less than a distance between the two fixing pins 384 of the latch plate 38. The latch plate 38 locks or unlocks the chip card 30 by means of the fixing pins engaging with the fixing holes 442 of the connecting plate 48.

The receiving groove 14 can also be a slot defined in the housing 10 with the strips 16 correspondingly being omitted.

It is believed that the embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A chip card retaining mechanism for retaining a chip card mounted in an electronic device, the electronic device including a housing, the housing having a battery compartment defined therein, the chip card retaining mechanism comprising:

a receiving portion defined in the housing for fittingly receiving the chip card therein, the receiving portion having an opening in communication with the battery compartment of the electronic device; and a locking assembly comprising:

a stop mechanism configured for preventing the chip card from being withdrawn from the receiving portion along a vertical direction;

a rotation mechanism;

a latch member, one end portion of the latch member rotatably connected with the housing by the rotation mechanism, and the latch member configured for rotating relative to the receiving portion and releasably closing the opening of the receiving portion, and directly resisting against the chip card to latch the chip card from being withdrawn from the receiving portion along a horizontal direction, and a rotating axis of the rotation mechanism being perpendicular to the receiving portion;

wherein the housing has an inner wall defining the battery compartment adjacent to the opening, the inner wall defines an arcuate slot extending from a bottom of the battery compartment to an upper surface of the housing;

a connecting plate extends from the inner wall and is offset from the opening, the latch member comprising a cylindrical end portion, the rotation mechanism includes a through hole defined in the cylindrical end portion, and a fixing post extends from the connecting plate to the upper surface of the housing and parallel to the inner wall, and the fixing post rotatably extends through the through hole.

2. A chip card retaining mechanism for retaining a chip card mounted in an electronic device, the electronic device including a housing, the housing having a compartment defined therein, the chip card retaining mechanism comprising:

a receiving portion defined in the housing for fittingly receiving the chip card therein, the receiving portion having an opening in communication with a battery compartment of the electronic device; and a locking assembly comprising:

a stop mechanism configured for preventing the chip card from being withdrawn from the receiving portion along a vertical direction;

a latch plate, a first end portion of the latch plate rotatably connected with the housing, such that an opposite second end portion of the latch plate is capable of closing the opening of the receiving portion, and resisting against the chip card to latch the chip card from being withdrawn from the receiving portion along a horizontal direction;

wherein the housing has an inner wall defining the battery compartment adjacent to the opening, the inner wall defines an arcuate slot extending from a bottom of the battery compartment to an upper surface of the housing; and a connecting plate extends from the inner wall and is offset from the opening, the first end portion defines a through hole, and a fixing post extends from the connecting plate to the upper surface of the housing and parallel to the inner wall, and the fixing post rotatably extends through the through hole.

* * * * *